(12) United States Patent
Parziale

(10) Patent No.: US 10,329,493 B2
(45) Date of Patent: Jun. 25, 2019

(54) RECIPROCATING BIOMASS CONVERSION SCHEME

(71) Applicant: THE TRUSTEES OF THE STEVENS INSTITUTE OF TECHNOLOGY, Hoboken, NJ (US)

(72) Inventor: Nicholaus Joseph Parziale, Hoboken, NJ (US)

(73) Assignee: The Trustees of the Stevens Institute of Technology, Hoboken, NJ (US)

(*) Notice: Subject to any disclaimer, the term of this patent is extended or adjusted under 35 U.S.C. 154(b) by 221 days.

(21) Appl. No.: 14/742,436

(22) Filed: Jun. 17, 2015

(65) Prior Publication Data
US 2015/0368585 A1    Dec. 24, 2015

Related U.S. Application Data

(60) Provisional application No. 62/013,750, filed on Jun. 18, 2014.

(51) Int. Cl.
  *C10G 1/00* (2006.01)
  *C10G 3/00* (2006.01)
  *C11C 3/00* (2006.01)

(52) U.S. Cl.
  CPC ............ *C10G 3/00* (2013.01); *C10G 1/00* (2013.01); *C11C 3/00* (2013.01); *Y02P 30/20* (2015.11)

(58) Field of Classification Search
  CPC .... C10G 1/00; C10G 3/00; C11C 3/00; Y02P 30/20
  See application file for complete search history.

(56) References Cited

U.S. PATENT DOCUMENTS 2,814,552 A    11/1957    Van Dijck
2,927,006 A     3/1960    Brooks
(Continued)

FOREIGN PATENT DOCUMENTS

CA    2836126 A1    11/2012
EP    0951347 B1    10/2007
(Continued)

OTHER PUBLICATIONS

Bioenergy Technologies Office, Multiyear Program Plan, U.S. Department of Energy, (2015) 224 pages.
(Continued)

*Primary Examiner* — Latosha Hines
(74) *Attorney, Agent, or Firm* — Greenberg Traurig, LLP

(57) ABSTRACT

A method for converting a biomass to a bio-oil includes providing a four-stroke internal combustion engine having at least one cylinder, at least one piston, and a crankshaft coupled to each of the at least one piston. The method also includes coupling a power source to the crankshaft in a manner such that the power source drives rotation of the crankshaft. The method also includes injecting a first mixture including a biomass and a non-oxidizing compression gas into one of the cylinders. The method also includes compressing and heating the first mixture during a compression stroke of the pistons. The compression and heating of the first mixture pyrolizes the biomass to produce a second mixture including a bio-oil and the compression gas. The method also includes decompressing and cooling the second mixture during an expansion stroke of the pistons. The decompression and cooling of the second mixture quenches secondary pyrolysis.

15 Claims, 4 Drawing Sheets

(56) References Cited

U.S. PATENT DOCUMENTS

| | | | |
|---|---|---|---|
| 3,981,277 A * | 9/1976 | Abom | F02M 21/12 |
| | | | 123/23 |
| 4,336,771 A * | 6/1982 | Perkins | F02B 45/02 |
| | | | 123/198 DA |
| 7,779,627 B1 * | 8/2010 | Ries | F02B 75/287 |
| | | | 123/198 F |
| 8,022,260 B2 | 9/2011 | O'Connor et al. | |
| 8,669,404 B2 | 3/2014 | Shulenberger et al. | |
| 8,691,079 B2 | 4/2014 | Iaccino | |
| 2010/0180805 A1 | 7/2010 | Cheiky | |
| 2012/0031383 A1 * | 2/2012 | Stockhausen | F02B 33/20 |
| | | | 123/70 R |

FOREIGN PATENT DOCUMENTS

| | | | |
|---|---|---|---|
| EP | 2610327 A1 | 7/2013 | |
| WO | WO99/00512 | 1/1999 | |
| WO | WO2010/045320 A2 | 4/2010 | |
| WO | WO 2010129996 A1 | 11/2010 | |
| WO | WO 2011087877 A2 | 7/2011 | |
| WO | WO 2012158579 A1 | 11/2012 | |
| WO | WO 20120154270 A2 | 11/2012 | |
| WO | WO 2013127527 A1 * | 9/2013 | F02D 41/3035 |
| WO | WO-2013127527 A1 * | 9/2013 | F02D 41/3035 |

OTHER PUBLICATIONS

Boateng et al., "Production of Bio-oil from Alfalfa Stems by Fluidized-Bed Fast Pyrolysis," Industrial & Engineering Chemistry Research, vol. 47, (2008), pp. 4115-4122.

Bridgewater, "Review of fast pyrolysis of biomass and product upgrading," Biomass and Bioenergy, vol. 38, (2012), pp. 68-94.

Brown, "Biochar Production Technology," from Biochar for Environmental Management: Science and Technology, Earthscan, (2009). 25 pages.

Diebold, "A Unified, Global Model For the Pyrolysis of Cellulose," Biomass and Bioenergy, vol. 7, (1994), pp. 75-85.

Jones et al., "Production of Gasoline and Diesel from Biomass via Fast Pyrolysis, Hydrotreating and Hydrocracking: A Design Case," Pacific Northwest National Laboratory PNNL-18284, (Feb. 2009), 76 pages.

Laird, "The Charcoal Vision: A Win-Win-Win Scenario for Simultaneously Producing Bioenergy, Permanently Sequestering Carbon, while Improving Soil and Water Quality," Agronomy Journal, vol. 100, Issue 1, (2008), pp. 178-181.

Lehmann, "A handful of Carbon," Nature, vol. 447, (May 10, 2007), pp. 143-144.

Mani et al., "Grinding performance and physical properties of wheat and barley straws, corn stover and switchgrass," Biomass and Bioenergy, vol. 27, (2004), pp. 339-352.

Mohan et al., "Pyrolysis of Wood/Biomass for Bio-oil: A Critical Review," Energy & Fuels, vol. 20, (2006), pp. 848-889.

Mullen et al., "Bio-oil and bio-char production from corn cobs and stover by fast pyrolysis," Biomass and Bioenergy, vol. 34, (2010), pp. 67-74.

Wright et al., "Distributed processing of biomass to bio-oil for subsequent production of Fischer-Tropsch Liquids," Biofuels, Bioproducts and Biorefining, vol. 2, (2008), pp. 229-238.

Xue et al., "A CFD model for biomass fast pyrolysis in fluidized-bed reactors," Chemical Engineering Science, vol. 66, (2011), pp. 2440-2452.

* cited by examiner

RECIPROCATING BIOMASS CONVERSION SCHEME

CROSS-REFERENCE TO RELATED APPLICATION

The present application is a Section 111(a) application relating to and claiming the benefit of commonly owned, co-pending U.S. Provisional Patent Application No. 62/013,750, titled "RECIPROCATING BIOMASS CONVERSION SCHEME," having a filing date of Jun. 18, 2014, which is incorporated by reference herein in its entirety.

FIELD OF THE INVENTION

The exemplary embodiments relate to conversion reactors and, more particularly, to conversion reactors for the conversion of biomass to bioenergy and biochemicals.

BACKGROUND OF THE INVENTION

Fast pyrolysis, also referred to as flash pyrolysis, is a process whereby biomass is decomposed in an environment without an oxidizing agent at temperatures of approximately 500° C. for short times (e.g., on the order of less than five seconds). Thermo-chemical biomass conversion by fast pyrolysis to bio-oil, bio-char, and bio-gas is a part of a path to an alternative energy source because of the upgrade in heating value and density such that it may be easily transported as part of a new distribution network. Effective methods of biomass conversion to bio-oil are of interest because bio-oil represents a deployable energy carrier with favorable source characteristics (e.g., it can be produced in situ and is carbon-neutral). In fast pyrolysis, biomass is pulverized, pyrolyzed, and the bio-products are recovered. Bio-oil can be used directly in boilers (e.g., for heating or electricity), or upgraded for use as a fuel.

There are a number of reactor types for the fast pyrolysis of biomass: entrained flow reactor, wire mesh reactor, vacuum furnace reactor, vortex reactor, rotating reactor, microwave reactor, fluidized-bed reactor, and the circulating fluidized-bed reactor. These reactors are complicated and require a large external energy source for operation. The fluidized-bed reactor ("FBR") is representative of the current state of the art. The FBR requires a condenser to cool the bio-products to quench the secondary pyrolysis reactions. The condenser is an active cooling component that can lead to heat loss and system inefficiency. Primary pyrolysis reactions create the pyrolysis vapor which condenses to bio-oil, whereas secondary pyrolysis reactions adversely affect the bio-oil quality and should be avoided. Thus, improvement of thermal efficiency and control over the primary and secondary pyrolysis reactions are an objective of this invention.

SUMMARY OF THE INVENTION

In an embodiment, a method for converting a biomass to a bio-oil includes providing a four-stroke internal combustion engine having at least one cylinder, at least one piston, each of the at least one piston disposed within a corresponding one of the at least one cylinder, and a crankshaft coupled to each of the at least one piston. The method also includes coupling a power source to the crankshaft in a manner such that the power source drives rotation of the crankshaft. The method also includes, during an intake stroke of at least one of the at least one piston, injecting a first mixture including the biomass and a non-oxidizing compression gas into at least one of the at least one cylinder corresponding to the at least one of the at least one piston. The method also includes, during a compression stroke of the at least one of the at least one piston, compressing and heating the first mixture. The compression and heating of the first mixture pyrolizes the biomass to produce a second mixture including a bio-oil and the compression gas. The method also includes, during an expansion stroke of the at least one of the at least one piston, decompressing and cooling the second mixture. The decompression and cooling of the second mixture quenches secondary pyrolysis of the bio-oil.

In an embodiment, the method also includes, during an exhaust stroke of the at least one of the at least one piston, expelling the second mixture from the at least one of the at least one cylinder. In an embodiment, the compression gas includes one or more of argon, nitrogen, carbon dioxide, carbon monoxide, and air. In an embodiment, the biomass includes one or more of corn stover, municipal waste, and agricultural waste. In an embodiment, the method also includes separating the bio-oil from the compression gas.

In an embodiment, the second mixture also includes one or more of bio-char and bio-gas. In an embodiment, the method also includes recycling the one or more of bio-char and bio-gas as biomass. In an embodiment, the at least one cylinder includes at least two cylinders and the at least one piston includes at least two pistons. The four-stroke internal combustion engine is arranged such that the compression stroke of one of the at least two pistons is synchronized with the expansion stroke of the other of the at least two pistons. In an embodiment, the four-stroke internal combustion engine includes a diesel engine.

In an embodiment, the method also includes upgrading the bio-oil for use as a fuel. In an embodiment, the method also includes providing the bio-oil for use in a boiler. In an embodiment, the biomass is pulverized. In an embodiment, the pulverized biomass includes a plurality of particles of the biomass. In an embodiment, the particles have an average diameter in a range of about 25 microns to about 200 microns.

BRIEF DESCRIPTION OF FIGURES

For a more complete understanding of the present invention, reference is made to the following detailed description of an exemplary embodiment considered in conjunction with the accompanying drawings, in which.

DETAILED DESCRIPTION OF THE INVENTION

The exemplary embodiments relate to a reciprocating biomass conversion scheme for production of bio-oil by fast-pyrolysis using a re-purposed 4-cycle internal combustion engine ("ICE"). The cycle includes the steps of intake, compression/heating, expansion, and exhaust. An inert gas and a small volume-fraction of pulverized biomass are input into the ICE intake, and the crankshaft is cycled by an external energy source to supply process heat to the cylinders. The biomass is converted during the compression/heating stroke, and then the bio-products are expelled during the exhaust stroke. The benefits of the reciprocating biomass conversion scheme of the exemplary embodiments relative to the state of the art are:

1. Increased efficiency: the reciprocating biomass conversion scheme requires less energy per unit mass of biomass than does a fluidized bed reactor of comparable footprint. The impact is that operation costs could be reduced.
2. Increased throughput: the biomass feed-rate (mass per unit time) is higher for the reciprocating biomass conversion scheme than for a fluidized bed reactor of comparable footprint. The impact is decreased costs of biomass to biofuel conversion.
3. Improved bio-oil quality: the quality of the bio-oil produced by the reciprocating biomass conversion scheme is of higher quality than the state of the art. The impact of higher quality bio-oil is reduced cost of bio-oil to biofuel upgrading.

Figure 1:
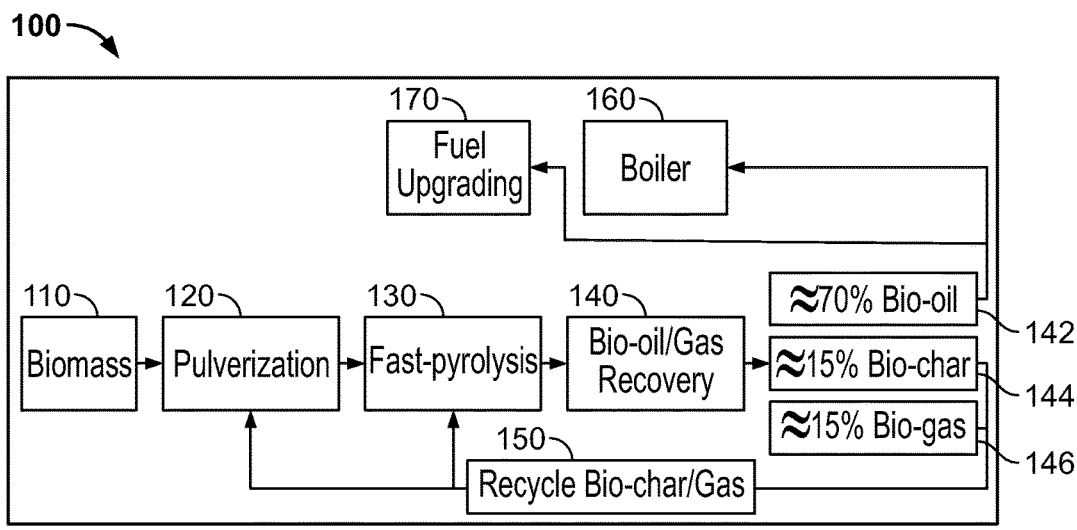
FIG. 1 is a schematic illustration of a technique for converting biomass into bio-products.

FIG. 1 illustrates a schematic representation of an exemplary conversion scheme 100. As a raw material, the conversion scheme 100 uses biomass 110. As described herein, biomass 100 may include virgin cellulose, corn stover, municipal waste, agricultural waste, or any other appropriate biomass. As a first step in the conversion scheme 100, the biomass 110 is pulverized 120 through any means known in the art to form small particles of the biomass 110. The pulverization 120 may result in small particles of the biomass 110 in a range of about 25 µm to about 200 µm in diameter. The efficacy of the exemplary embodiments will be discussed hereinafter with reference to pulverization resulting in the biomass 110 forming spherical particles 50 µm in diameter, but those of skill in the art will understand that this is only one exemplary result of the pulverization 120 and any pulverization 120 to form suitably small particles may suffice.

After the pulverization 120 has been performed, fast pyrolysis 130 is performed on the pulverized biomass 110. An exemplary mechanism for the fast pyrolysis 130 will be discussed in further detail hereinafter with reference to FIG. 2. The product of the fast pyrolysis 130 is recovery products 140. The recovery products 140 may include bio-oil 142, bio-gas 144, and bio-char 146. In an embodiment, the recovery products 140 may include about 70% bio-oil 142, about 15% bio-char 144, and about 15% bio-gas 146. The bio-char 144 and the bio-gas 146 may be separated from the bio-oil 142 using any suitable technique, and may be recycled 150 and used again as inputs for the fast pyrolysis 130. In an embodiment, the bio-oil 142 produced by the fast pyrolysis 130 may be used as-is, such as in a boiler 160 (e.g., for heating or electricity). In an embodiment, the bio-oil 142 produced by the fast pyrolysis 130 may be upgraded through a process of fuel upgrading 170 (e.g., for auto fuel, aviation fuel, etc.).

Figure 2:
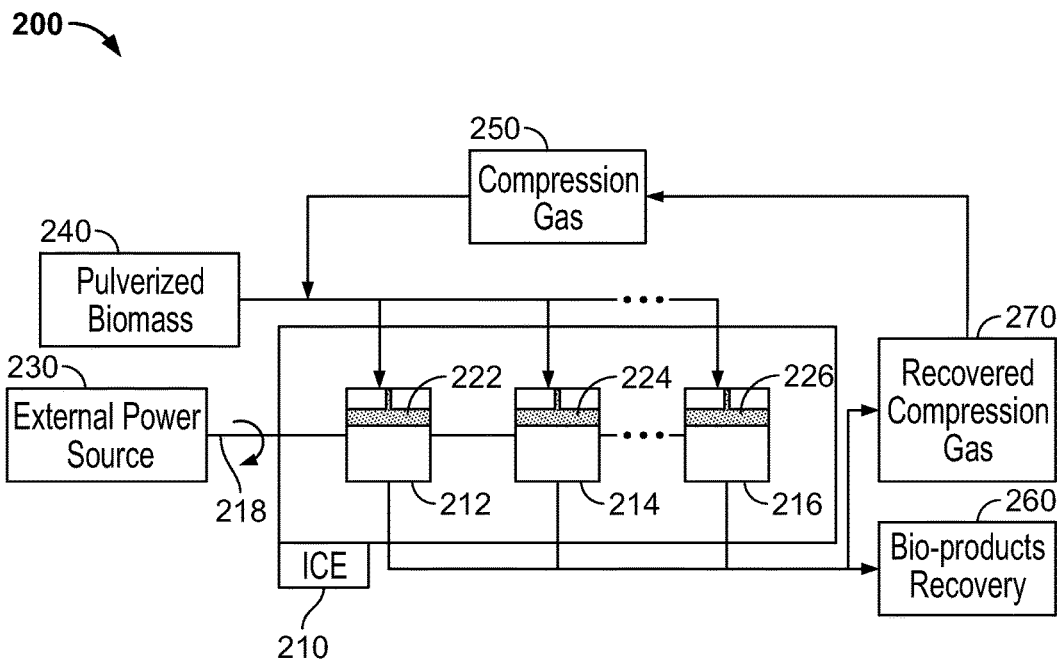
FIG. 2 is a schematic illustration of a pyrolysis process that forms a portion of the overall technique of FIG. 1.

FIG. 2 illustrates a schematic representation of a system 200 that may perform the fast pyrolysis 130 described above with reference to FIG. 1. The system 200 includes a four-stroke internal combustion engine ("ICE") 210, which will be referred to hereinafter as "engine 210" for brevity. The engine 210 includes a plurality of cylinders including a first cylinder 212, a second cylinder 214, and an n-th cylinder 216, each of which includes a corresponding piston 222, 224, 226. It will be apparent to those of skill in the art that the engine 210 may include any number of cylinders n depending on factors such as the space available, the purpose for which it is to be used, etc. The engine 210 also includes a crankshaft 218. It will be apparent to those of skill in the art that, under the normal operation of an ICE such as the engine 210, the crankshaft 218 would serve to provide output power generated by the operation of the engine 210. However, in the exemplary system 200, the crankshaft 218 is driven by an external power source 230 in order to power operation of the engine 210 as will be described hereinafter.

Pulverized biomass 240 (e.g., as produced through pulverization 120) is injected into each of the cylinders 212, 214, 216 of the engine 210. A non-oxidizing compression gas 250 is also injected into each of the cylinders 212, 214, 216 of the engine 210. In an embodiment, the compression gas 250 is argon. In an embodiment, the compression gas 250 is nitrogen. In an embodiment, the compression gas 250 is a mixture of carbon dioxide and carbon monoxide. The ratio of the pulverized biomass 240 to the compression gas 250 is such that the pulverized biomass 240 comprises a small volume fraction of the mixture thereof.

The performance of the exemplary engine 210 will be described hereinafter with specific reference to the cylinder 212. It will be apparent to those of skill in the art that the same disclosure may be equally applicable to the cylinders 214, 216. The mixture of the pulverized biomass 240 and the compression gas 250 is injected into the cylinder 212 during an intake stroke of the piston 222, such that the volume within the cylinder 212 is substantially at its maximum after the injection. The external power source 230 drives the crankshaft 218 and thereby drives a compression stroke of the piston 222, decreasing the volume within the cylinder 212. The decrease of volume within the cylinder 212 correspondingly compresses and heats the mixture of the pulverized biomass 240 and the compression gas 250. In an embodiment, the heating rate during the compression stroke of the piston 222 exceeds 2000° C./s.

Process heat due to the compression of the pulverized biomass 240 and the compression gas 250 is transferred from the compression gas 250 to the pulverized biomass 240. In an embodiment, the maximum temperature of the pulverized biomass 240 is over 500° C. Heating of the pulverized biomass 240 induces fast pyrolysis, which thermo-chemically converts the pulverized biomass 240 to bio-products 260 (e.g., bio-oil 142, bio-gas 144, and bio-char 146, as described above with reference to FIG. 1). In an embodiment, fast pyrolysis may occur under the Diebold mechanism. As a result of this conversion, the mixture within the cylinder 212 becomes a mixture of the compression gas 250 and the bio-products 260. The continued work applied by the external power source 230 in driving the crankshaft 218, together with the increased pressure within the cylinder 212, now drives the expansion stroke of the piston 222, increasing the volume within the cylinder 212. It will be apparent to those of skill in the art that the engine 210 may be arranged such that cylinders thereof may be in opposition; for example, the crankshaft may simultaneously increase the volume within cylinder 212 while decreasing the volume within cylinder 214, and vice versa.

The increase of the volume within the cylinder 212 caused by the expansion stroke of the piston 222 rapidly decreases the temperature and pressure of the mixture of the compression gas 250 and the bio-products 260. In an embodiment, the cooling rate within the cylinder 212 during the expansion stroke of the piston 222 is over minus-5000° C./s. The rapid cooling rate of the bio-products 260 during the expansion stroke of the piston 222 quenches undesirable secondary pyrolysis reactions of the bio-products 260. An exhaust stroke of the piston 222 forces the bio-products 260 and the compression gas 250 from the cylinder 212. Because the compression gas 250 is a non-oxidizing gas, it is substantially unaltered by the pyrolysis described above. Recovered compression gas 270 is separated from the bio-products 260 and may be recycled within the system 200 as compression gas 250. The bio-products 260 may be separated out as described above (e.g., yielding about 70% bio-oil 142, about 15% bio-char 144, and about 15% bio-gas 146), with the bio-oil 142 being suitable for purposes as described above and the bio-char 144 and bio-gas 146 suitable for recycling within the system 200 as pulverized biomass 240.

Figure 3:
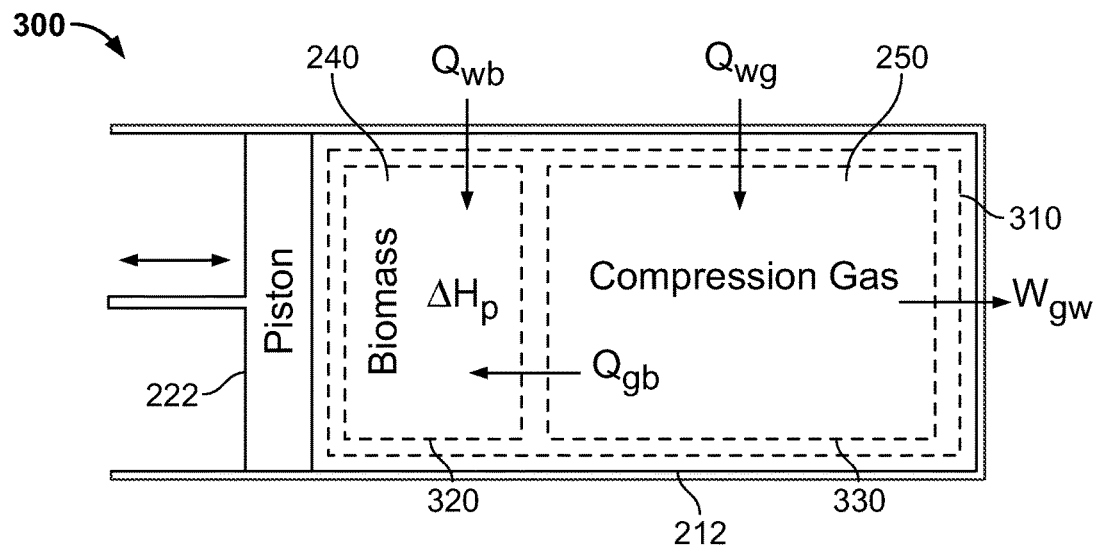
FIG. 3 is a conceptual illustration of a cylinder that is used in the pyrolysis process of FIG. 2.

FIG. 3 illustrates a more detailed conceptual view of a cylinder 300 (e.g., the cylinder 212 and the piston 222 described above with reference to FIG. 2) that will be used hereinafter to analyze the energy balance within a control volume. The cylinder 212 contains a well-mixed, evenly-distributed mixture of the biomass 240 and the compression gas 250; in the illustration of FIG. 3, the biomass 240 and compression gas are shown separated for clarity to indicate the energy flow therebetween. In FIG. 3, Q represents the energy that is transferred into a control volume by heat transfer, W represents the energy that is transferred out of a control volume by work, and $\Delta H_P$ is the change in enthalpy required to pyrolyze the biomass 240. The subscripts b, g, and w represent the biomass 240, the compression gas 250, and the wall of the cylinder 212, respectively. Two subscripts in succession indicate "from a to b," e.g., $Q_{gb}$ is the energy transferred from the compression gas 250 to the biomass 240 by heat transfer. Additionally, it may be assumed that the pressure of the compression gas 250 and the biomass 240 are equal, i.e., $P_g = P_b = P$.

The change in internal energy for the compression gas 250 may be represented according to the expression $\Delta U_g = c_{vg} n_g \Delta T_g$ and the work performed by the compression gas 250 on the wall of the cylinder 212 may be expressed as $W_{gw} = P\Delta V_g$. Here, $c_{vg}$, $n_g$, $\Delta T_g$, and $V_g$ are the constant-volume molar specific heat, number of moles, change in temperature, and volume of the compression gas 250, respectively. The first law for the control volume of the compression gas 250 may be written as:

$$\Delta U_g = Q_g - W_g = -Q_{gb} + Q_{wg} - W_{gw}$$

$$\Delta U g = C_{vg} n_g \Delta T_g = -Q_{gb} + Q_{wg} - P\Delta V_g$$

The change in enthalpy of the biomass 240, $\Delta H_b$, includes the change in sensible enthalpy, $\Delta H_S$, and enthalpy of the pyrolysis reactions, $\Delta H_P$, as:

$$\Delta H_b = \Delta H_S + \Delta H P = \Delta U_b + \Delta(PV_b).$$

It may be assumed that there is no volumetric change of the biomass 240. The change in enthalpy due to pyrolysis of the biomass 240 is $\Delta H_P = m_P \Delta h_P$, and the change in sensible enthalpy is $\Delta HS = m_b c_b \Delta Tb$. Here, $m_P$, $\Delta h_P$, $m_b$, $c_b$, and $\Delta T_b$ are the pyrolyzed mass, mass-specific enthalpy of the pyrolysis, the mass of the biomass 240, the specific heat of the biomass 240, and the change in temperature of the biomass 240, respectively. The first law for the control volume for the biomass can be written as:

$$\Delta U_b = Q_b - W_b = Q_{gb} + Q_{wb} - W_b$$

$$\Delta U_b = m_b c_b \Delta T_b + m_P \Delta h_P - V_b \Delta P = Q_{gb} + Q_{wb}$$

Based on the above, a model of decomposition of the biomass 240 in the system 200 may be created. In this model, heat transfer to the walls of the cylinders 212, 214, 216 is not considered (i.e., $Q_{wb} = Q_{wg} = 0$), it is assumed that all of the biomass 240 is pyrolized (i.e., $m_P = m_b$), and the change in pressure term is assumed to be small for the biomass 240 (i.e., $V_b \Delta P \ll m_b c_b \Delta T_b$, and $V_b \Delta P \ll m_P \Delta h_P$). Based on these assumptions, the first law equations expressed above can be rewritten as:

$$\Delta T_g = -\frac{Q_{gb} + P\Delta V_g}{c_{vg} n_g}, \text{ and}$$

$$Q_{gb} = m_b c_b \Delta T_b + m_b \Delta h_P$$

Figure 4:
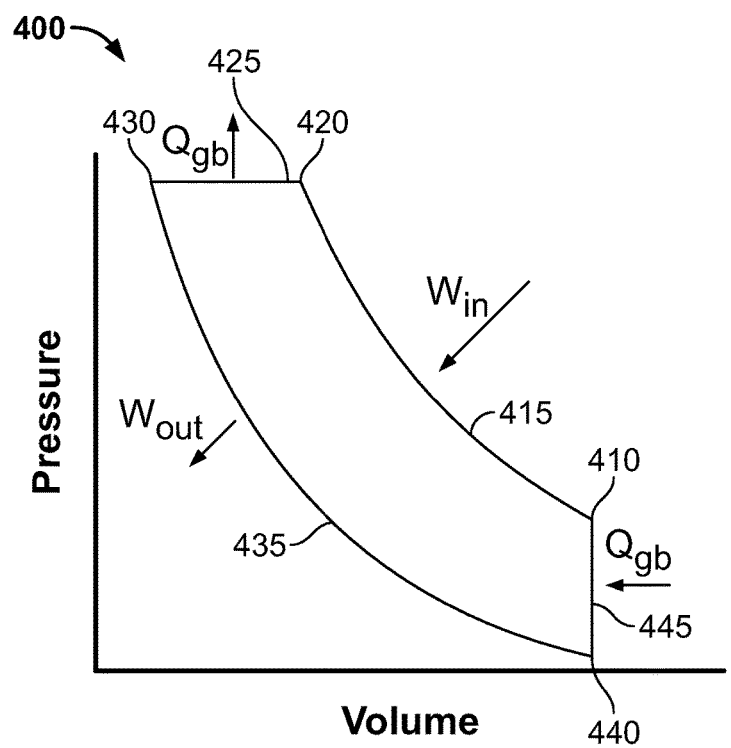
FIG. 4 is an ideal plot of pressure against volume for a cycle of the cylinder of FIG. 3.
Figure 5:
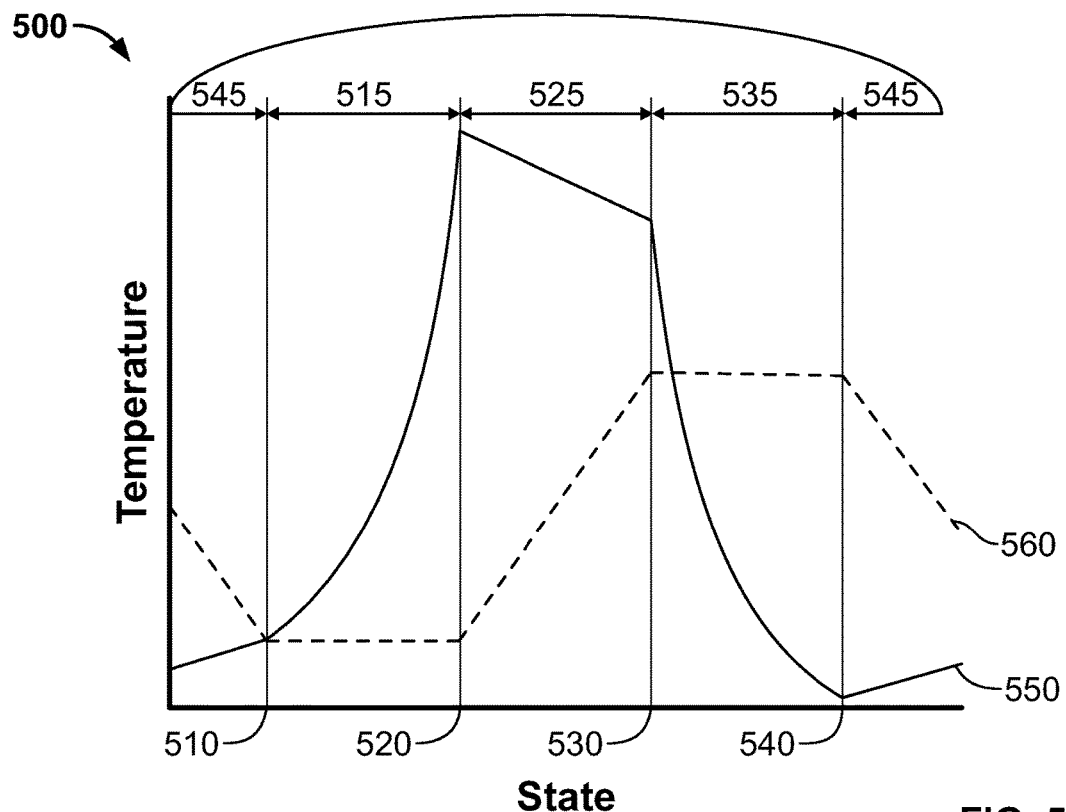
FIG. 5 is an ideal temperature-state plot for a cycle of the cylinder of FIG. 3.

FIGS. 4 and 5 illustrate a pressure-volume space 400 and a temperature-state space 500, respectively, of the compression gas 250 of the system 200. More particularly, FIGS. 4 and 5 present an ideal analysis of the system 200. In FIG. 4, which illustrates a pressure-volume space 400 of a cycle of the system 200 in a counterclockwise direction, the pressure within a cylinder (e.g., cylinder 212) is plotted against the volume within the cylinder. In FIG. 5, temperatures are plotted against state; plot 550 illustrates the temperature of the compression gas 250 and plot 560 illustrates the pressure of the biomass 240. In FIGS. 4 and 5, states 410, 420, 430 and 440 correspond to states 510, 520, 530 and 540, respectively, and phases 415, 425, 435 and 445 correspond to phases 515, 525, 535 and 545, respectively.

In phase 415, 515, work $W_{in}$ is applied by the piston 222 to compress the compression gas 250 in an isentropic manner. The compression occurs quickly relative to any heat transfer, so it may be assumed that $Qg_b = \Delta T_b = 0$. In phase 425, 525, isobaric heat transfer $Q_{gb}$ from the compression gas 250 to the biomass 240 occurs. The biomass 240 undergoes complete conversion (based on the assumption noted above that the entire biomass 240 is pyrolyzed) at a temperature that is typical of fast pyrolysis, converting biomass 240 into bio-products 260. In phase 435, 535, isentropic expansion of the compression gas 250 occurs, with work $W_{out}$ being applied to the piston 222. The expansion occurs quickly relative to any heat transfer, so it may be assumed that $Qg_b = \Delta T_b = 0$. In phase 445, 545, isochoric heat transfer $Q_{gb}$ occurs from the bio-products 260 to the compression gas 250. As noted above, this heat transfer quenches undesirable secondary pyrolysis. It will be apparent to those of skill in the art that the cycle described with reference to FIGS. 4 and 5 represents two strokes of the exemplary four-stroke engine 210, with the exhaust and injection strokes being extraneous to the cycle described above.

The following adapts the ideal model described above with reference to FIGS. 3-5 into a detailed model, to enable comparison to other biomass conversion schemes, by formulating the first law expressions above as differential equations. The time-rate form of the first law expression for the compression gas 250 may be expressed as:

$$\frac{dT_g}{dt} = \left(-\dot{Q}_{gb} + \dot{Q}_{wg} - \frac{dV_g}{dt}\right)/(c_{vg} n_g)$$

Based on the above, it may be inferred that the time-rate of change of temperature is increased by decrease in the volume of the cylinder 212 and decreased by outward heat transfer; the term $dV_g/dt$ may be prescribed by the kinematic motion of the piston 222.

The analysis assumes that the biomass 240 includes a collection of independent spheres acting as a lumped mass $m_b$ with a constant volume and specific heat $c_b$. However, individual fractions of the mass $m_b$ may evolve as computed by the first order kinetics mechanism of the Diebold model of pyrolysis. The model may also consider the rate of energy loss due to pyrolysis, $\Delta \dot{H}_P = \dot{m}_P \Delta h_P$. The time-rate form of the first law expression for the biomass 240 may then be expressed as:

$$\frac{dT_b}{dt} = \left(\dot{Q}_{gb} + \dot{Q}_{wb} - \Delta \dot{H}_P + V_b \frac{dP}{dt}\right) / (m_b c_b)$$

In the above, the dP/dt term can be related to the time rate of change of the temperature of the compression gas 250 and to the change of the volume within the cylinder 212 through the differentiation of the logarithm of the ideal gas law, as shown:

$$\frac{dP}{dt} = P\left(\frac{1}{T_g}\frac{dT_g}{dt} - \frac{1}{V_g}\frac{dV_g}{dt}\right)$$

More detailed consideration of the rate of heat loss from the pyrolysis reactions requires a calculation of the rate at which the biomass 240 is decomposed during the pyrolysis. The following will be based on pyrolysis predicted by the Diebold model. The first-order kinetic rates of Arrhenius form are tabulated from each component in the Diebold model. The kinetic rates can be expressed as:

$$k_i = A_i \exp(E_i/(R_u T_b))$$

The Diebold model considers six components: virgin cellulose ("VC"), active cellulose ("AC"), char and water ("CW"), primary vapors ("PV"), secondary gas ("SG"), and secondary tar ("ST"). Under the Diebold model, VC is converted to AC and CW. The kinetic rate of conversion from VC to AC is referred to as $k_{CC}$; the kinetic rate of conversion from VC to AC is referred to as $k_{CA}$. AC is converted to CW, PV, and SG. The kinetic rate of conversion from AC to CW is referred to as $k_{AC}$; the kinetic rate of conversion from AC to PV is referred to as $k_{AV}$; the kinetic rate of conversion from AC to SG is referred to as $k_{AG}$. PV is converted to SG and ST. The kinetic rate of conversion from PV to SG is referred to as $k_{VG}$; the kinetic rate of conversion from PV to ST is referred to as $k_{VT}$. Thus, the rate of mass production of each component can be expressed as:

$$\dot{m}_{VC} = -k_{CA} m_{VC} - k_{CC} m_{VC}$$

$$\dot{m}_{CW} = k_{CC} m_{VC} + k_{AC} m_{AC}$$

$$\dot{m}_{AC} = k_{CA} m_{VC} - k_{AC} m_{AC} - k_{AG} m_{AC} - k_{AV} m_{AC}$$

$$\dot{m}_{PV} = k_{AV} m_{AC} - k_{VG} m_{PV} - k_{VT} m_{PV}$$

$$\dot{m}_{SG} = k_{AG} m_{AC} + k_{VG} m_{PV}$$

$$\dot{m}_{ST} = k_{VT} m_{PV}$$

The mass-specific heat of the pyrolysis reaction may be expressed as $\Delta h_P = 538$ kJ/kg. The overall mass-conversion rate due to pyrolysis, $\dot{m}_P$, may be considered to be the rate at which VC and AC are decomposed; therefore, the rate of change in enthalpy due to pyrolysis may be expressed as:

$$\Delta \dot{H}_P = \dot{m}_P \Delta h_P = \frac{(k_{CC} m_{VC} + k_{AC} m_{AC} + k_{AG} m_{AC} + k_{AV} m_{AC})}{\Delta h_P}$$

The above expressions include radiation and convection in their heat transfer terms, and heat transfer coefficients are modified to account for transpiration effects where appropriate. The above expression may be analyzed based on the assumptions that the walls of the cylinder 212 have the properties of steel and the biomass 240 has the thermo-physical properties of corn stover. Convection to the walls of the cylinder 212 and to the biomass 240 are assumed to be steady. Thermo-physical properties for the compression gas 250 may be modeled using chemical kinetics software such as Cantera. The system expressed by the above equations may be integrated in time to calculate the evolution of pressure within the cylinder 212, temperature of the biomass 240, temperature of the compression gas 250, and conversion fractions during the compression and expansion strokes of the piston 222, as illustrated in FIGS. 4 and 5. The modeling may use the initial conditions that the biomass 240 consists entirely of VC, the biomass 240 and compression gas 250 begin at temperature $T_b = T_g = 22°$ C., and the mass $m_b$ and radius $r_b$ of the biomass are specified. Modeling may be performed using computing software such as MATLAB, developed by The MathWorks, Inc., of Natick, Mass.

In an embodiment, the system 200 may be implemented with a 7.3 liter, 8-cylinder, 4-stroke diesel engine adapted from an intended use in a truck. Such an exemplary engine may have a bore of 106 mm and a stroke of 104 mm. The exemplary engine may be cycled at 100 rpm. The exemplary engine may have a volumetric compression ratio of 22.4, and it may be assumed that the dynamic compression ratio is 75% of the dynamic compression ratio. In an embodiment, argon may be used as the compression gas, and spherical biomass particles having a diameter of about 50 μm and the thermo-physical properties may be used as the biomass.

Figure 6:
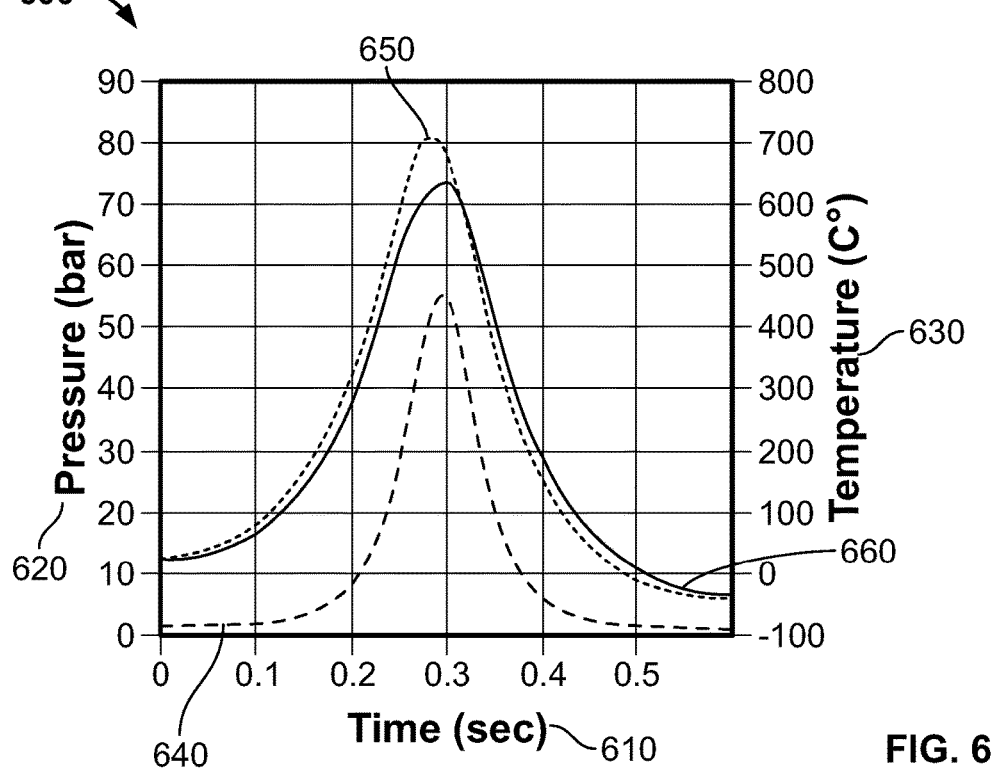
FIG. 6 is a plot of temperature and pressure against time for an analysis of a model of the cylinder of FIG. 3.
Figure 7:
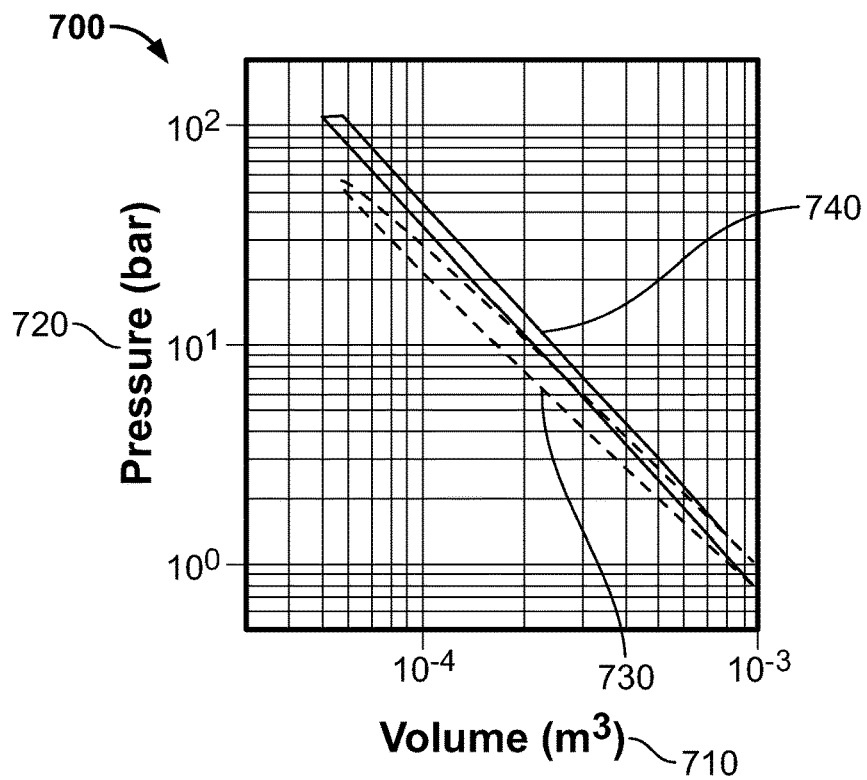
FIG. 7 is a plot of ideal and analyzed pressure against volume for the cylinder of FIG. 3.
Figure 8:
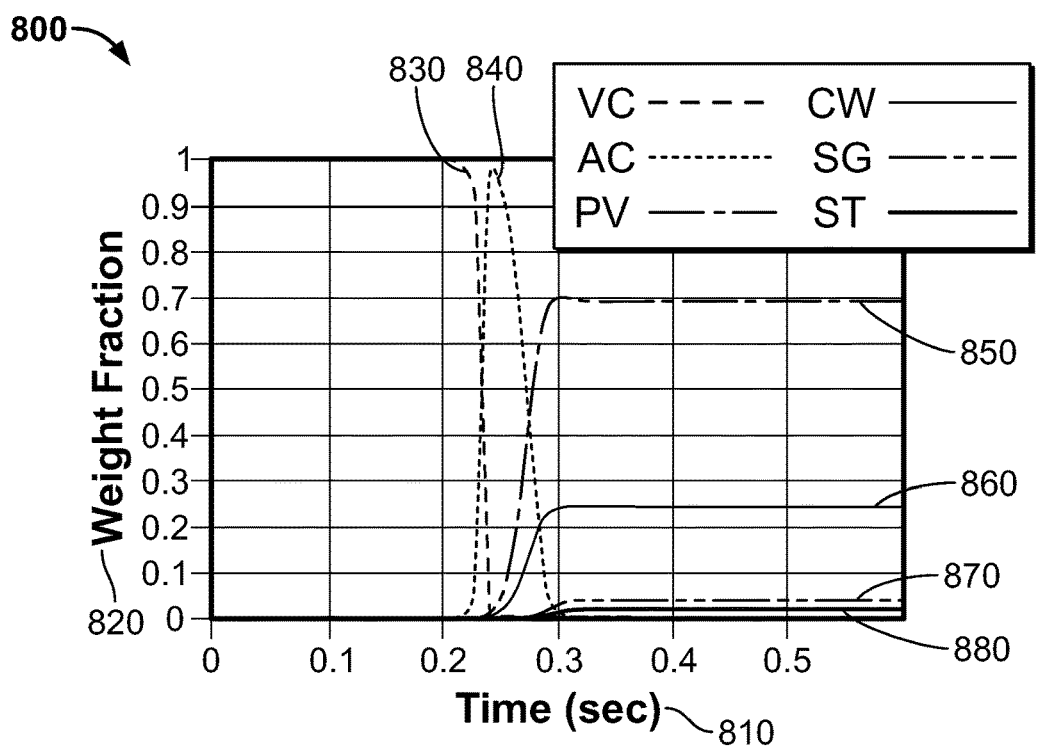
FIG. 8 is a plot of weight fractions of biomass and various bio-products for an analysis of a model of the cylinder of FIG. 3.

FIGS. 6-8 present the results of the analysis of the detailed model described above. FIG. 6 illustrates a chart 600 showing time histories of pressure 620 and temperature 630 along a vertical axis, against time 610 along a horizontal axis. The chart 600 includes a plot 640 of pressure P within cylinder 212, a plot 650 of the temperature $T_g$ of the compression gas 250, and a plot 660 of the temperature $T_b$ of the biomass 240 (or the bio-products 260 into which the biomass is converted), all of which may be determined based on the above. It may be seen that the maximum temperature of the biomass 240 is over 500° C. and that the heating rate exceeds 5000° C./s during the compression stroke. The maximum temperature and heating rate are appropriate for fast pyrolysis. It may further be seen that the cooling rate of the bio-products 260 is over −5000° C./s during the expansion stroke, which is sufficient to quench the undesirable secondary pyrolysis reactions.

FIG. 7 illustrates a chart 700 showing pressure 720 along a vertical axis against volume 710 along a horizontal axis. The chart 700 includes a plot 730 of a detailed model of a cycle as predicted by the differential equations above, as compared to a plot 740 for an ideal cycle of the system 200. The ideal plot 740 may reach a higher pressure because it ignores heat transfer to the biomass 240 and the wall of the cylinder 212 during the compression stroke.

FIG. 8 illustrates a chart 800 showing weight fractions during the conversion of biomass 240 to bio-products 260. In the chart 800, weight fractions 820 are plotted against a time axis 810. The chart 800 includes a plot 830 for virgin cellulose, a plot 840 for active cellulose, a plot 850 for pyrolysis vapor, a plot 860 for char and water, a plot 870 for secondary gas, and a plot 880 for secondary tar. As noted above, the weight fractions shown in the chart 800 may be calculated according to the Diebold model for pyrolysis. It may be observed that the virgin cellulose and active cellulose are degraded primarily between 0.2-0.3 s. This phenomena manifests itself in the calculated temperature of the biomass 240, as shown in FIG. 6 as a slight change in heating rate; this is because appreciable amounts of energy are utilized for the heat of pyrolysis during that time. At the end of the expansion stroke, 70% (by weight) of the biomass is converted to pyrolysis vapor, as indicated by plot 850. Little undesirable secondary gas and tar are produced because the rapid expansion quenches all reactions within cylinder 212, as indicated by plots 870 and 880.

The following table compares the exemplary system 200 based on a 7.3 liter diesel engine, as described above, to a small fluidized bed reactor. These represent an appropriate comparison because they have roughly the same footprint, and therefore may be assumed to have roughly similar capital costs. For the fluidized bed reactor, the input energy per unit of biomass includes input energy required to heat the biomass. The calculations described above predict that significantly less input energy is required per unit of biomass, with a significantly increased biomass feed rate. In the table below, the power ratio refers to the ratio of power available from bio-oil output to power required to operate the reactor.

| Type | Gas flow rate | Input energy per unit of biomass | Mass flow rate of biomass | Power ratio |
|---|---|---|---|---|
| Exemplary system | 38 kg/hr (Ar) | 1.8 MJ/kg | 4.3 kg/hr | 7.6 |
| Fluidized bed reactor | 4.8 kg/hr ($N_2$) | 3.5 MJ/kg | 2.2 kg/hr | 3.5 |

Therefore, it may be seen that the exemplary embodiments may provide a system that increases biomass throughput by roughly 100% while decreasing the mass-specific energy requirement by roughly 50% as compared to the state of the art (i.e., the fluidized bed reactor).

In an embodiment, the reciprocating biomass conversion scheme is intended to pyrolyze biomass to bio-oil, bio-char, and bio-gas. In an embodiment, this is achieved with an inert compression gas, however, biomass gasification can be achieved by injecting the pulverized biomass with ambient air. Other feedstocks are also appropriate for fast pyrolysis or gasification according to the present invention. Alternative feedstocks include municipal and agricultural waste streams and other feedstocks known in the art.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention.

What is claimed is:

1. A method for converting, via pyrolysis, a pulverized biomass into a bio-oil using a four-stroke diesel-type engine having a cylinder, a piston moveably mounted within said cylinder, and means for reciprocating said piston within said cylinder so as to perform an intake stroke, a compression stroke, an expansion stroke, and an exhaust stroke, said means including a crankshaft coupled to said piston and an external power source adapted to drive said crankshaft and hence said piston, said method comprising the steps of:

(1) providing said pulverized biomass;
(2) mixing said pulverized biomass with a non-oxidizing compression gas to form a first mixture;
(3) actuating said external power source so as to drive said crankshaft and thereby repeatedly reciprocate said piston within said cylinder for a number of cycles, whereby said piston sequentially performs its said intake stroke, its said compression stroke, its said expansion stroke, and its said exhaust stroke;
(4) injecting said first mixture into said cylinder during said intake stroke of said piston;
(5) compressing said first mixture within said cylinder during said compression stroke of said piston to thereby heat said first mixture to a temperature that pyrolyzes said pulverized biomass, thereby converting said pulverized biomass into said bio-oil, which mixes with said compression gas of said first mixture to form a second mixture;
(6) decompressing said second mixture within said cylinder during said expansion stroke of said piston to thereby cool said second mixture and quench secondary pyrolysis of said bio-oil;
(7) expelling said second mixture from said cylinder during said exhaust stroke of said piston;
(8) collecting said second mixture after its expulsion from said cylinder;
(9) separating said compression gas from said second mixture after the expulsion of said second mixture from said cylinder; and
(10) repeating said steps (4)-(7) using said compression gas from said step (9) as said non-oxidizing compression gas of said first mixture.

2. The method of claim 1, wherein said compression gas is an inert gas selected from the group consisting of argon, nitrogen, carbon dioxide, carbon monoxide, and mixtures thereof.

3. The method of claim 1, wherein said biomass includes one or more of corn stover, municipal waste, and agricultural waste.

4. The method of claim 1, wherein said diesel-type engine includes a plurality of piston/cylinder combinations, the piston of each piston/cylinder combination being coupled to said crankshaft and driven by said external power source so as to perform said steps (3)-(7); and wherein said plurality of piston/cylinder combinations is arranged in said internal combustion engine such that the compression stroke of the piston of one of said piston/cylinder combinations is synchronized with the expansion stroke of the piston of another one of said piston/cylinder combinations.

5. The method of claim 1, wherein said pulverized biomass includes a plurality of biomass particles having an average diameter in a range of about 25 microns to about 200 microns.

6. A method for converting, via pyrolysis, a pulverized biomass into a bio-oil using a four-stroke diesel-type engine having a cylinder, a piston moveably mounted within said cylinder, and means for reciprocating said piston within said cylinder so as to perform an intake stroke, a compression stroke, an expansion stroke, and an exhaust stroke, said means including a crankshaft coupled to said piston and an external power source adapted to drive said crankshaft and hence said piston, said method comprising the steps of:

(1) providing said pulverized biomass;
(2) mixing said pulverized biomass with a non-oxidizing compression gas to form a first mixture;
(3) actuating said external power source so as to drive said crankshaft and thereby repeatedly reciprocate said piston within said cylinder for a number of cycles, whereby said piston sequentially performs its said intake stroke, its said compression stroke, its said expansion stroke, and its said exhaust stroke;
(4) injecting said first mixture into said cylinder during said intake stroke of said piston;
(5) compressing said first mixture within said cylinder during said compression stroke of said piston to thereby heat said first mixture to a temperature that pyrolyzes said pulverized biomass, thereby converting said pulverized biomass into said bio-oil, which mixes with said compression gas of said first mixture to form a second mixture;
(6) decompressing said second mixture within said cylinder during said expansion stroke of said piston to thereby cool said second mixture and quench secondary pyrolysis of said bio-oil;
(7) expelling said second mixture from said cylinder during said exhaust stroke of said piston;
(8) collecting said second mixture after its expulsion from said cylinder; and
(9) separating said bio-oil from said second mixture after the expulsion of said second mixture from said cylinder, whereby said bio-oil may be used as-is or may be upgraded for use as a fuel.

7. The method of claim 6, wherein said compression gas is an inert gas selected from the group consisting of argon, nitrogen, carbon dioxide, carbon monoxide, and mixtures thereof.

8. The method of claim 6, wherein said biomass includes one or more of corn stover, municipal waste, and agricultural waste.

9. The method of claim 6, wherein said diesel-type engine includes a plurality of piston/cylinder combinations, the piston of each piston/cylinder combination being coupled to said crankshaft and driven by said external power source so as to perform said steps (3)-(7); and wherein said plurality of piston/cylinder combinations is arranged in said internal combustion engine such that the compression stroke of the piston of one of said piston/cylinder combinations is synchronized with the expansion stroke of the piston of another one of said piston/cylinder combinations.

10. The method of claim 6, wherein said pulverized biomass includes a plurality of biomass particles having an average diameter in a range of about 25 microns to about 200 microns.

11. A method for converting, via pyrolysis, a pulverized biomass into a bio-oil using a four-stroke diesel-type engine having a cylinder, a piston moveably mounted within said cylinder, and means for reciprocating said piston within said cylinder so as to perform an intake stroke, a compression stroke, an expansion stroke, and an exhaust stroke, said means including a crankshaft coupled to said piston and an external power source adapted to drive said crankshaft and hence said piston, said method comprising the steps of:
(1) providing said pulverized biomass;
(2) mixing said pulverized biomass with a non-oxidizing compression gas to form a first mixture;
(3) actuating said external power source so as to drive said crankshaft and thereby repeatedly reciprocate said piston within said cylinder for a number of cycles, whereby said piston sequentially performs its said intake stroke, its said compression stroke, its said expansion stroke, and its said exhaust stroke;
(4) injecting said first mixture into said cylinder during said intake stroke of said piston;
(5) compressing said first mixture within said cylinder during said compression stroke of said piston to thereby heat said first mixture to a temperature that pyrolyzes said pulverized biomass, thereby converting said pulverized biomass into said bio-oil, which mixes with said compression gas of said first mixture to form a second mixture, said second mixture further including a bio-char and a bio-gas;
(6) decompressing said second mixture within said cylinder during said expansion stroke of said piston to thereby cool said second mixture and quench secondary pyrolysis of said bio-oil;
(7) expelling said second mixture from said cylinder during said exhaust stroke of said piston;
(8) collecting said second mixture after its expulsion from said cylinder;
(9) separating said bio-char and/or said bio-gas from said second mixture after the expulsion of said second mixture from said cylinder; and
(10) repeating said steps (4)-(7) using said bio-char and/or said bio-gas from said step (9) as said pulverized biomass.

12. The method of claim 11, wherein said compression gas is an inert gas selected from the group consisting of argon, nitrogen, carbon dioxide, carbon monoxide, and mixtures thereof.

13. The method of claim 11, wherein said biomass includes one or more of corn stover, municipal waste, and agricultural waste.

14. The method of claim 11, wherein said diesel-type engine includes a plurality of piston/cylinder combinations, the piston of each piston/cylinder combination being coupled to said crankshaft and driven by said external power source so as to perform said steps (3)-(7); and wherein said plurality of piston/cylinder combinations is arranged in said internal combustion engine such that the compression stroke of the piston of one of said piston/cylinder combinations is synchronized with the expansion stroke of the piston of another one of said piston/cylinder combinations.

15. The method of claim 11, wherein said pulverized biomass includes a plurality of biomass particles having an average diameter in a range of about 25 microns to about 200 microns.

* * * * *